June 1, 1926.
V. O. KNUDSEN ET AL
1,586,952
PRECISION INSTRUMENT FOR MAKING A DIFFERENTIAL DIAGNOSIS BETWEEN
INTERNAL AND MIDDLE EAR DEAFNESS AND FOR CHARTING THE
ACUITY OF HEARING
Filed August 30, 1924
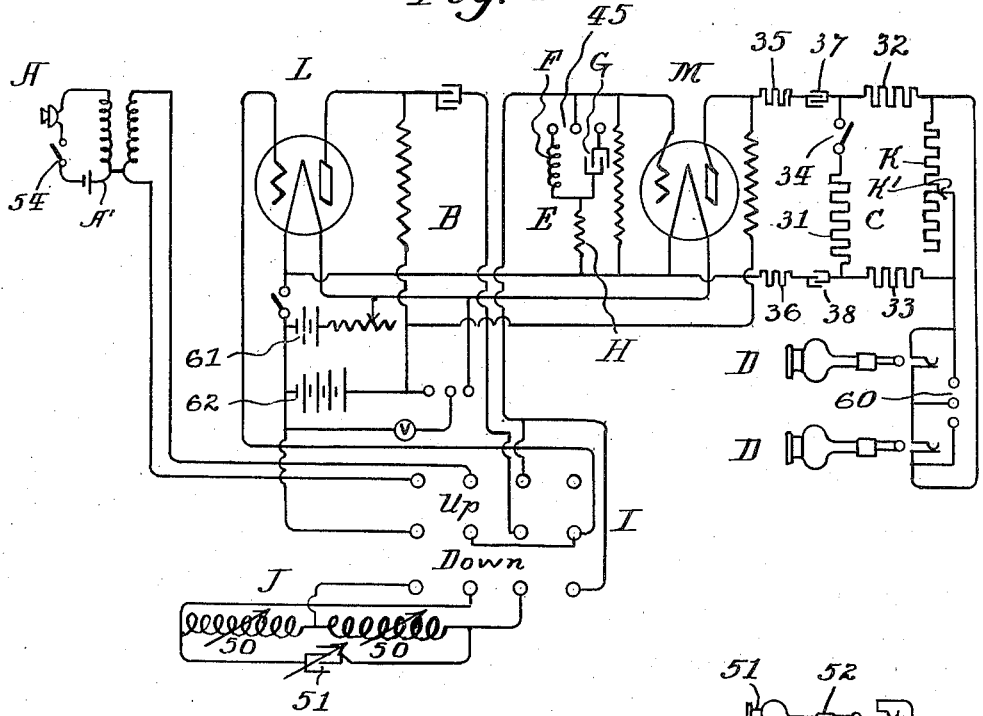
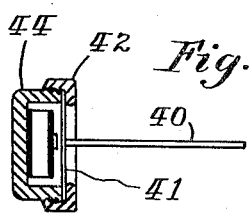
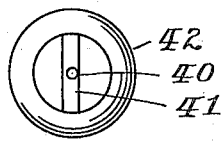
Vern O. Knudsen and
Isaac H. Jones,
INVENTORS.
BY: Bradbury & Caswell
ATTORNEYS.

Patented June 1, 1926.

1,586,952

UNITED STATES PATENT OFFICE.

VERN O. KNUDSEN AND ISAAC H. JONES, OF LOS ANGELES, CALIFORNIA.

PRECISION INSTRUMENT FOR MAKING A DIFFERENTIAL DIAGNOSIS BETWEEN INTERNAL AND MIDDLE EAR DEAFNESS AND FOR CHARTING THE ACUITY OF HEARING.

Application filed August 30, 1924. Serial No. 735,138.

Our invention relates to a new and useful precision instrument for making a differential diagnosis between internal and middle ear deafness and for charting the acuity of hearing for the range of tones employed in speech and music. An object of our invention is the production of an instrument of the kind stated which is quick and accurate in determining the degree and source of deafness and which will enable the examiner to definitely chart the results so that a thorough diagnosis can be recorded. Among further objects is the production of an instrument of the kind stated which can be used effectively at the will of the examiner to quickly arrive at accurate results in testing hearing or to more slowly arrive at precise results. An essential feature of this invention is the utilization of the audion bulb for amplifying the conversational voice or whisper in testing the hearing of patients. The instrument includes the use of an amplifier and of an oscillator. These two features when combined with our improvements enable the practicing otologist to arrive quickly at an accurate diagnosis in simple cases of deafness or a very precise analysis in intricate cases.

The usual methods employed for testing auditory acuity are by means of the conversational voice, the whispered voice, tuning forks, ticking of a watch and the Galton whistle. These permit of only a rough approximation in testing and the results are extremely crude and inexact. Tuning forks made by different makers differ in their physical characteristics. The same tuning fork, even though it always be hit with blows of equal force, will give tones of different loudness, depending upon the sound absorbing material in the room in which the fork is used and depending also upon the shape of the head of the patient. Besides this there is no standard method of recording the results of the measurements made by the tuning fork. The tests made with the ticking of a watch or with the whispered or conversational voice are even more uncertain than the tuning fork tests.

Attempts have also been made to use the audion bulb for testing deafness but wherever such attempts have been made the apparatus employed has been complicated, and involved precision measurements and laborious methods for which the average man in practice does not have the time and, in many instances, the inclination to carry out.

Our improvement overcomes the above objections and inexact features of prior devices by the use of improvements which combine a special speech amplifier and an oscillator into a single unit. By its use a direct test of the sensitiveness of the cochlea and a differential diagnosis between internal and middle ear lesions can be easily and quickly made or a precise quantitative measurement of the auditory acuity of the patient can be determined. In other words the nature and degree of the hearing defect can be quickly read off of our invention, or a precise charting of the hearing function made. Our invention also includes in its combination of elements a tone generator by means of which all tones necessary for testing acuity throughout the entire range of frequencies in speech and music can be produced. It also possesses a means for determining bone conduction, quantitatively, and it possesses a means of producing a noise in one ear, thus deafening this ear, while the other ear is being tested. It facilitates tests for malingering. It also makes possible the determination of the physical characteristics of an artificial aid to hearing. After a patient has been tested by this new instrument, one can, as it were, "write a prescription" for an artificial aid to hearing that would meet his peculiar requirements. To be precise, tests with this new instrument will answer the question as to whether any type of artificial aid will correct the hearing defect. Then if the defect is of a correctible type, the physical characteristics of such an artificial aid can be designed with precision. This improvement further provides means by which the examiner can from time to time more easily and accurately observe the progress made by the use of corrective measures prescribed in the treatment of defective hearing.

In the accompanying drawing forming part of this specification, Figure 1 is a diagrammatic view of our invention showing one form of circuit employed, it being understood that other forms of circuits may be used without departing from the spirit of our invention; Fig. 2 is a side elevation partly in section of a telephone receiver constructed in accordance with our invention for use in testing bone conduction; Fig. 3 is an end view of the structure shown in Fig. 2, and Fig. 4 is a diagrammatic view of our improvement as used with our invention for creating a noise in one ear.

For the purpose of describing the circuit shown it may be divided into four principal parts; a speech amplifier, an oscillator, a noise apparatus, and a device for measuring bone conduction. The use of these parts will be embodied into the detail description of the parts.

In use, speech uttered by the examiner making a test, enters the microphone A and is then amplified by a two stage vacuum tube amplifier B, in the output of which are a volume control C and a pair of telephone receivers D—D, one receiver for each ear of the patient.

The amplifier B, has associated with it a distortion circuit E, consisting of an inductance F, a capacitance G and a resistance H. Combinations of these three are placed between two stages of the amplifier so that the input of the second stage of the amplifier may be connected across various combinations of the inductance F, the capacitance G and the resistance H. The amplifier preferentially amplifies the high frequency components, the low frequency components or the high and low frequency components of speech. The varying degrees of selectivity of this preferential amplification is determined by the resistance H. For example, if it is desired to amplify the low frequency components of speech more than the high frequency components, the in-put of the second stage of the amplifier is connected across the capacitance G and the resistance H. On the other hand, if it is desired to amplify the high frequency components more than the low frequency components, the in-put of the second stage of the amplifier is connected across the inductance F and the resistance H. The amount of amplification necessary to produce normal speech sounds in the ear under examination is determined by setting a dial control indicated at K'. When the instrument is used as a speech amplifier the four-pole-double-throw switch I must be closed in the "up" direction as indicated in Figure 1.

If the four-pole-double-throw switch I is closed in the "down" direction the instrument is coupled with an oscillatory circuit J and is converted into a tone generator. Audiometric tests may then be made in the usual manner, namely, by producing tones of different pitch and reducing the loudness of each tone to the threshold of audibility. The frequency of the tones generated by the oscillator is determined by the setting of the dials on the adjustable inductance coils 50—50 and the capacitance 51 of the oscillatory circuit J. The oscillator is adapted to produce tones of any desired loudness or pitch in the range employed in speech or music.

A special device associated with the circuit in place of one of the receivers D makes it possible to measure bone conduction and compare it quantitatively with air conduction. This device in its simplest form consists of an aluminum rod 40 about eight inches long and one eighth of an inch in diameter mounted end wise upon a receiver viabratory diaphragm (see Fig. 2). This diaphragm is a narrow strip 41 of soft iron secured in a telephone receiver 44 below the cap piece 42 in the usual manner, with the rod 40 projecting outwardly therefrom. The telephone receiver is adapted to be inserted in the circuit in place of one of the telephone receivers D and in use the rod is pushed against the mastoid bone or any other part of the bony cranium. The receiver is then actuated by current of the proper frequency determined by the oscillator of circuit J, which transmits a tone from the receiver and by the vibrating diaphragm along the rod 40 and through the bony path into the cochlea. The intensity of the tone is then reduced by means of the resistance network constituting the volume control C until the tone reaches the lower limit of audibility. The reading of the dial associated with the resistance K gives a measure of the bone conduction at that frequency, which can be compared with the amount required for a normal ear. Tests of bone conduction can be made at other frequencies by simply using different rods, each one of which responds better to one particular frequency than any other, or the same rod will serve for testing at several different tones. Other rods of different materials and different dimensions may be employed than as described.

There is also associated with the instrument a feature which serves as a noise apparatus. This apparatus shown in Fig. 4 consists of an electrical buzzer 46 connected in a circuit containing a battery 47, switch 48 and telephone jack 49. A receiver 51 of large inductance may be connected across the make and break contact points of the buzzer by inserting the plug 52 with which the receiver is connected into the jack 49, and when used by a patient is held over one ear while one of the receivers D is held over the other. The noise produced in the ear from the receiver 51 deafens this ear, while the other ear is being tested either by the amplifier or the tone from the tone generator.

The microphone A and its circuit A' are of the usual conventional type, said circuit being provided with a switch 54 so that the microphone can be used at will by the examiner. The audion bulbs L and M are also of conventional type. The receivers D—D are ordinary. The switch 60 is of single pole double throw type for use in testing for "malingering" and enables the examiner to change from one ear to the other or to both ears and to direct conversational voice or tones at will.

The adjustable resistance K across the circuit enables the control of the loudness of the voice or tones in the ear or ears of the patient. The volume control consists of the resistances K, 31, 32 and 33 in the output of the circuit, the resistance 31 containing a circuit breaking switch 34, and the resistances 32 and 33 being fixed. The resistance 31 being low introduces a low resistance shunt across the output circuit when the switch 34 is closed which causes only a very small portion of the current to flow in the receivers. Condensers 37 and 38 prevent the direct current flowing through the plate circuit of the audion bulb M from flowing through the volume control C and receivers D—D. Fixed resistances 35 and 36 as well as 32 and 33 are for the purpose of approximating the same current flow through the output circuit for all adjustments of the variable resistance K.

The amplifying circuit B is of usual type and may be changed as desired. The filaments of both audion bulbs L and M are heated by the battery 61 and the plate potential for both bulbs is supplied by current from the battery 62.

The switch I is used to convert the instrument either into an amplifier or into an oscillator. The distortion circuit E which consists of the inductance F, capacitance G and resistance H is arranged so that a suitable switch 45 may be used in three ways, "open"—"closed to left" or "closed to right." When "open" the entire distortion circuit is disconnected and uniform amplification of all of the frequency components occurs. When "closed to left" the inductance F and resistance H are connected in series and shunted across the input to bulb M of amplifier. This provides "high pass" amplification, that is the high frequency components of speech are given full amplification and as you come down the scale of pitch or frequency there is less and less amplification. When the switch 45 is "closed to the right" the condenser G and resistance H are connected in series and are shunted across input of bulb M. This provides "low pass" amplification and as we go up the scale of pitch the amplification is less and less.

The oscillatory circuit J is of usual type in which a resonating circuit consisting of inductance 50—50 and capacitance 51 is connected across the plate and grid of the bulb L. By giving different values to inductance 50—50 and capacitance 51, tones of any desired frequency within the audible range can be produced. These oscillations are amplified by the audion bulb M in the usual manner. The loudness of these tones is controlled by the volume control C.

The instrument is adapted, among others, to make the following tests: First, to detect internal or middle ear lesions or to determine whether the deafness is of a perceptive or a conductive type. Second, to determine the degree or percentage of hearing defect. Third, to test for malingering, and fourth, to test for total or partial deafness of one ear.

Test number 1 with the amplifier is conducted as follows: The examiner speaks into the microphone A and the patient listens through the receivers D—D. If the deafness is of the conductive type, appropriate amplification will overcome conductive impairment so that the patient will hear the speech clearly and distinctly. Such appropriate amplification is attained by adjusting the type of amplification with the distortion circuit E, and the degree of amplification with the volume control C. The nature of the hearing defect is indicated by the setting of the switch 45 and the reading of the dial associated with the resistance K. This is an indication of conductive impairment, showing that the defect is in the external or middle ear. If on the other hand, the deafness is of advanced perceptive type, amplification will tend to make the speech sound indistinct and confused to the patient. This is an indication of nerve impairment, showing that the defect is in the internal ear. If, however, the patient hears better with "high pass" amplification, it is an indication that the patient has only a slight nerve impairment.

Test number 2 with the amplifier to determine the degree of the hearing defect: The examiner whispers into the microphone from a distance of about one inch, and reduces the loudness of the amplified whispers until the patient just ceases to understand what the examiner says. The reading of the dial associated with the resistance K for this condition enables the examiner to read off the percentage of hearing for the patient.

Test number 3 for malingering is conducted by directing the conversational voice by means of the switch 60 to either ear at the will of the examiner.

Test number 4. In testing for total deafness of one ear a noise apparatus is used with the ear in which there is known to be hearing, while the other ear is tested for total deafness.

Tests Nos. 1, 2 and 4 can be conducted with the oscillator portion of the instrument and the results precisely charted. Tones of definite pitch, from 64 double vibrations per second up to and beyond the upper limit of audibility are produced in the receivers D—D and these are reduced in loudness to the point of minimum audibility by means of the volume control C. We have with the amplifier an approximate and quick means of testing, and in the oscillator a precise but slow method.

In accordance with the patent statutes, we have described the principles of operation of our invention together with the apparatus which we now consider to represent the best embodiment thereof but we desire to have it understood that the apparatus shown is only illustrative and that the invention can be carried out by other means and applied to uses other than those above set forth within the scope of the following claims.

Having described our invention what we claim as new and desire to secure by Letters Patent is:

1. A precision instrument for making a differential diagnosis between internal and middle ear deafness and for charting the acuity of hearing, comprising, in combination, a receiver for use by the patient, an audion bulb amplifier associated with said receiver for amplifying the conversational voice, means for adjusting the degree of amplification to test the hearing of the patient, a tone generator also associated with said parts, means for changing the tone to determine the acuity of hearing, a microphone associated with said amplifier and means for selectively connecting either said microphone or said tone generator for use with said remaining parts whereby the simultaneous use of said microphone and tone generator is precluded.

2. A precision instrument for making a differential diagnosis between internal and middle ear deafness and for charting the acuity of hearing, comprising, in combination, a microphone, a receiver for use by the patient, an audion bulb amplifier associated with said microphone and receiver, a distortion circuit in the amplifier circuit containing an inductance, a capacitance and a resistance in series adapted to influence the operation of the amplifier output, an oscillator also associated with said parts, means for changing the tone produced by the oscillator to determine the acuity of hearing during the amplification function, said microphone and oscillator being so associated as to preclude their simultaneous use, means for selectively connecting either said microphone or said oscillator with said remaining parts, a volume control in the output of the amplifier and means connected with another receiver for use over one ear of the patient to create a noise in said ear while the other receiver is being used to test the hearing in the other ear.

VERN O. KNUDSEN.
ISAAC H. JONES.